May 12, 1959 F. J. KAESS ET AL 2,886,417
DIRECT MANUFACTURE OF POWDERY CALCIUM CYANAMIDE
Filed Feb. 18, 1954

INVENTORS
FRANZ J. KAESS
THOMAS FISCHER
FRANZ GÖTZINGER
HERMANN KRONACHER

United States Patent Office

2,886,417
Patented May 12, 1959

2,886,417

DIRECT MANUFACTURE OF POWDERY CALCIUM CYANAMIDE

Franz J. Kaess, Thomas Fischer and Franz Götzinger, Trostberg, and Hermann Kronacher, Feldkirchen, near Trostberg, Germany, assignors to Suddeutsche Kalkstickstoff-Werke A.G., Trostberg, Bavaria, Germany Application February 18, 1954, Serial No. 411,218

6 Claims. (Cl. 23—279)

The invention relates to process and apparatus for preparing calcium cyanamide from calcium carbide and nitrogen.

For the continuous preparation of calcium cyanamide, it has already been proposed to react the starting materials in a rotary kiln. However, it was found that the mass, irrespective of the particle size of the starting materials, had a strong caking tendency, and that the reaction product had to be subjected to an after-treatment in order to render it suitable for commercial use.

It has also been proposed to provide baffle rings in the rotary kiln so as to concentrate the reaction products which surround and dilute the calcium carbide in the course of the reaction. Such concentration by means of baffle rings, however, does not give the desired results because segregation takes place due to the uniform rotation of the kiln and to the different gravities of the calcium cyanamide and carbide. The reaction product, i.e. the calcium cyanamide, which is lighter, concentrates on top of the concentration zone and impedes or completely prevents the access of nitrogen to the underlying carbide.

It is a principal object of this invention to provide a method and apparatus for the continuous manufacture of powdery calcium cyanamide, which avoid the recited drawbacks.

Other objects and advantages will become apparent from a consideration of the specification and claims.

The apparatus according to the invention comprises a rotary drum, in which the baffle effect is accomplished by an enlargement at the feed end of the drum, whereby the axis of said enlargement forms an angle with the axis of the drum. It is of particular advantage to provide an enlargement which flares towards the exit end of the drum.

The invention will be well understood from the following description of certain illustrative embodiments thereof shown by way of example in the accompanying drawings, wherein.

Figure 1:
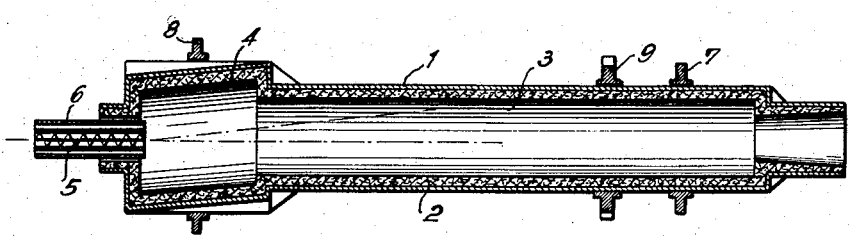
Fig. 1 is an elevational section, showing one embodiment of the invention.
Figure 2:
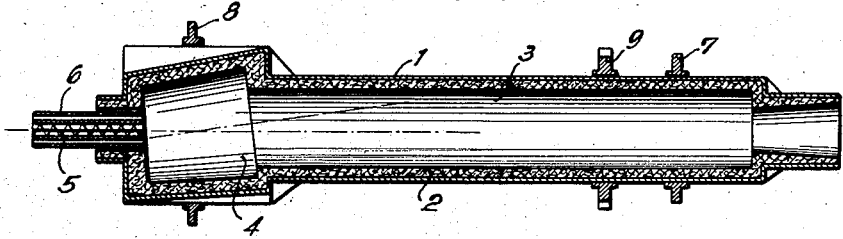
Fig. 2 is a section similar to Fig. 1, showing a modified construction of a rotary drum according to the invention.

It will be understood that the views of the drawing are purely diagrammatic.

Referring now to the drawings, like numerals identify similar parts, and, as will be seen, the kiln consists of a metal cylinder 1 provided with a refractory lining 2, enclosing a chamber 3. The kiln is mounted horizontally, preferably with a slight inclination of about 2° towards the exit end; it is rotated in races 7 and 8 and is driven by the annular gear 9. Near to one end, said chamber 3 is widened to an enlargement 4, the axis of which forms an angle with the axis of the chamber 3, and which allows concentrating or accumulating of the charged material. Calcium carbide, or a mixture of calcium carbide with calcium cyanamide, is fed into said enlargement 4 by a screw conveyor 5. Prior to the operation of the kiln, the enlargement 4 is filled with the reaction product, i.e. calcium cyanamide, preferably in powdery form, and heated. Instead of employing calcium cyanamide, the enlargement may be filled with another substance which does not take part in the reaction. For instance, the enlargement can be filled with carbon dust, which does not burn on heating because of the exclusion of air. Nitrogen is admitted through the tube 6.

In the enlargement 4, the introduced bed of calcium cyanamide or other inert substances is intimately mixed with the calcium carbide charge, which mixing operation is assisted by the angular relationship between the axis of the enlargement 4 and the kiln axis. Due to the presence of a large amount of calcium cyanamide or other inert material, the carbide concentration is relatively low and the temperature high, which conditions prevent caking in spite of the high temperatures.

The continuously charged calcium carbide is converted to at least 80 percent into calcium cyanamide, so that during the course of the process the bed consists of about 80 percent of calcium cyanamide.

If the carbide charge is mixed with calcium cyanamide, such calcium cyanamide has not the function to modify substantially the carbide concentration in the calcium cyanamide bed in the enlargement 4; said calcium cyanamide is admixed only in order to control the temperature and to ensure that a predetermined maximum temperature is not exceeded. The optimum reaction temperature is in the range of about 1000 to 1100° C.

For a daily production of 70 tons (metric) we use a rotary kiln, which has a diameter of about 2 m. and a length of about 14 m. of which 3 m. are taken up by the enlargement 4 and 11 m. by the chamber 3. The diameter of the enlargement is about 1.2 to 1.5 times that of the chamber and the axis of the enlargement and chamber form an angle of about 5 to 7 degrees.

This rotary kiln is operated in such a way that it is first filled with the inert material, preferably powdered calcium cyanamide, then heated to reaction temperature, and subsequently charged with powdered calcium carbide while nitrogen is passed into the kiln. When 60% CaC$_2$ is used, we adjust the rate of rotation of the kiln and the rate of travel therethrough in such a way that about 93 to 95 percent of the carbide is nitrogenated in the enlargement 4 within about 1 hour; subsequently the nitrogenation is completed in the chamber 3 to a product which contains not more than about 0.1% of residual carbide. During the nitrogenation, the calcium carbide is at all times so much diluted with calcium cyanamide as to prevent overheating and caking.

With the described rotary kiln, it is possible to use powdery carbide as starting material and powdery calcium cyanamide as filler and to obtain directly a powdery end product, which can be marketed in this form for use, for instance, as a herbicide. As it is well known in order to be effective as a herbicide, calcium cyanamide must be employed as a powder.

The rotary kiln of the invention may be used for intermittent or continuous charging, and it will be obvious that details of the described apparatus and method herein set forth may be varied within comparative wide limits without departure from the essential features of the invention.

We claim:

1. A rotary kiln suitable for the manufacture of calcium cyanamide comprising a rotary drum having a feed end and a discharge end, the feed end of said drum forming an enlargement having at its juncture with the discharge end a larger inner diameter than said discharge end, thus providing a retaining edge for the charge on its travel from the feed end to the discharge end, the center axis of said enlargement forming an angle of about 5 to 7 degrees with the center axis of said discharge end, which latter axis defines the axis of rotation of the drum, means to feed calcium carbide into the feed end of said drum, and means to admit nitrogen into said drum.

2. A rotary drum as defined in claim 1 wherein the ratio of the diameters of said enlargement and said discharge end is about 1.2 to 1.5:1.

3. A rotary kiln for the manufacture of calcium cyanamide comprising a rotary drum having a feed end and a discharge end, the feed end of said drum flaring in the direction of the discharge end having at the junction with said discharge end a larger inner diameter than said discharge end, thus forming a retaining edge for the charge traveling through the drum, the center axis of said feed end forming an angle of about 5 to 7 degrees with the center axis of said discharge end, which latter axis defines the axis of rotation of the drum, means to feed calcium carbide into the feed end of said drum, and means to admit nitrogen into said drum.

4. A rotary kiln for the direct manufacture of powdery calcium cyanamide from powdery calcium carbide comprising two immediately adjoining reaction chambers of different cross section, the first reaction chamber having at the junction of said chambers a diameter about 1.2 to 1.5 times larger than the diameter of the second reaction chamber and forming a retaining edge for the charge at the junction with said second reaction chamber, said first reaction chamber being arranged for retaining a charge of powdery calcium carbide until about 80 percent thereof have been nitrogenated, said second reaction chamber having at least twice the length of said first reaction chamber and being arranged for completing the nitrogenation of the calcium carbide delivered from said first reaction chamber, the center axis of said second reaction chamber defining the axis of rotation of the kiln and the center axis of said first reaction chamber being inclined against the center axis of said second reaction chamber by an angle of about 5 to 7 degrees.

5. A rotary kiln as defined in claim 1, wherein at the junction of the feed end and the discharge end the inner circumference of the feed end is eccentric to the inner circumference of the discharge end.

6. A rotary kiln having at its feed end an extension of larger diameter than the diameter of the kiln, the center axis of said extension forming an angle of about 5 to 7 degrees with the axis of rotation of the drum, said axis of rotation being coincident with the center axis of the drum, means to feed a charge into said extension, said charge advancing on rotation of said drum in a forward and backward motion through said extension due to said angular relationship of the center axis of the extension to the axis of rotation, and means to withdraw the charge from the drum.

References Cited in the file of this patent
UNITED STATES PATENTS

| | | |
|---|---|---|
| 1,337,750 | Carlson | Apr. 20, 1920 |
| 2,180,382 | Winter et al. | Nov. 21, 1939 |
| 2,259,702 | Lindhord | Oct. 21, 1941 |
| 2,352,051 | Wendlandt et al. | June 20, 1944 |